Feb. 10, 1970 C. E. HERENDEEN 3,495,221

DATA DETECTOR

Filed Nov. 13, 1967 5 Sheets-Sheet 1

INVENTOR.
Carl E. Herendeen

BY

AGENT

Feb. 10, 1970 C. E. HERENDEEN 3,495,221

DATA DETECTOR

Filed Nov. 13, 1967 5 Sheets-Sheet 2

Feb. 10, 1970 C. E. HERENDEEN 3,495,221

DATA DETECTOR

Filed Nov. 13, 1967 5 Sheets-Sheet 4

Feb. 10, 1970 C. E. HERENDEEN 3,495,221

DATA DETECTOR

Filed Nov. 13, 1967 5 Sheets-Sheet 5

United States Patent Office 3,495,221
Patented Feb. 10, 1970

3,495,221

DATA DETECTOR

Carl E. Herendeen, Fremont, Calif., assignor to Friden, Inc., a corporation of Delaware Filed Nov. 13, 1967, Ser. No. 682,194
Int. Cl. G06f *11/06*
U.S. Cl. 340—172.5 2 Claims

ABSTRACT OF THE DISCLOSURE

A data handling system utilizing an ultrasonic delay line for serial storage of a plurality of data word representing signals, is coupled with a means for automatically indicating, to the human operator, the presence and absence of data words in any or all of a set of registers, each register being made up of a series of space-time compartments or segments of the delay line.

CROSS-REFERENCE TO RELATED APPLICATIONS

The organization and operation of an ultrasonic delay line as a data storage or memory means in conjunction with manually operable data entry keys and internal data manipulation controls is shown and described in copending applications Ser. No. 319,704 for "Calculator," filed Oct. 29, 1963, and Ser. No. 539,569, for "Square Root Calculator and Method," filed Apr. 1, 1966, by Robert A. Ragen, both of the aforementioned copending patent applications being assigned to the same assignee as the present application. It is not necessary, however, to a person skilled in the art to which the present invention pertains, for understanding the manner and process of making and using the present invention to know the internal organization and operation of data entry and manipulation controls as set forth in the aforementioned patent applications, as will be apparent from the description of the present invention set forth below.

BACKGROUND, FIELD OF INVENTION

This invention concerns a data handling apparatus and, more particularly, concerns a means for indicating the presence or absence of data in one or more internal registers of a data handling apparatus.

BACKGROUND, PRIOR ART

Data handling apparatuses, such as, for example, that shown and described in the aforementioned U.S. patent applications, have internal data storage means or registers. In order for the human operator to operate the apparatus in as rapid and efficient a manner as possible, it is desirable that the operator know whether or not there is data (data herein meaning a number other than zero) in the various registers.

In the data handling systems of the aforementioned copending applications the actual contents of four of the internal registers are displayed on the face of a cathode-ray tube at all times. When a particular register has no data contained therein the visual display shows a series or line of "0's" for that register. Thus, by easy visual inspection of the cathode-ray tube display it can be ascertained whether or not any or all of the registers contain any data.

However, some data handling apparatuses have no visual display of the data or lack of data currently in its various registers during various operations of the apparatus. One example of such a data handling apparatus is what is known as a printing calculator. Printing calculators having internal storage registers must ordinarily be commanded or operated specially to print, on paper tape, the contents of such internal registers in order to determine if any data is contained in such registers.

The process or step of interrupting the solving of a problem on a printing calculator, in order to determine if there is data or not in an internal register, so that the problem may proceed with the use of the internal register, if such register contains no data, is time-consuming and distracting to some human operators.

SUMMARY

Briefly described, the present invention is accomplished in a data handling apparatus of the printing calculator type having one or more internal storage registers by automatically and periodically gating the contents of the internal registers to an input of an associated respective bistable device such as, for example, the set input of any well-known electronically operated flip-flop. The associated flip-flop is placed in its set state if there is any data at all in the associated register, while such register remains in its reset state if there is no data in the associated register.

Electric lamps mounted on the front panel of the apparatus are associated with and controlled by respective ones of the flip-flops. When a flip-flop is placed in its set condition the associated lamp is illuminated. Thus, there is provided a visual indication as to whether or not the individual internal registers contain data.

It is, therefore, an object of the present invention to provide a means for visually indicating the presence and absence of data in internal registers of a data handling apparatus.

The features of novelty that are considered characteristic of this invention are set forth with particularity in the appended claims. The organization and method of operation of the invention may best be understood from the following description when read in connection with the accompanying drawings.

DESCRIPTION OF A PREFERRED EMBODIMENT

Figure 1:
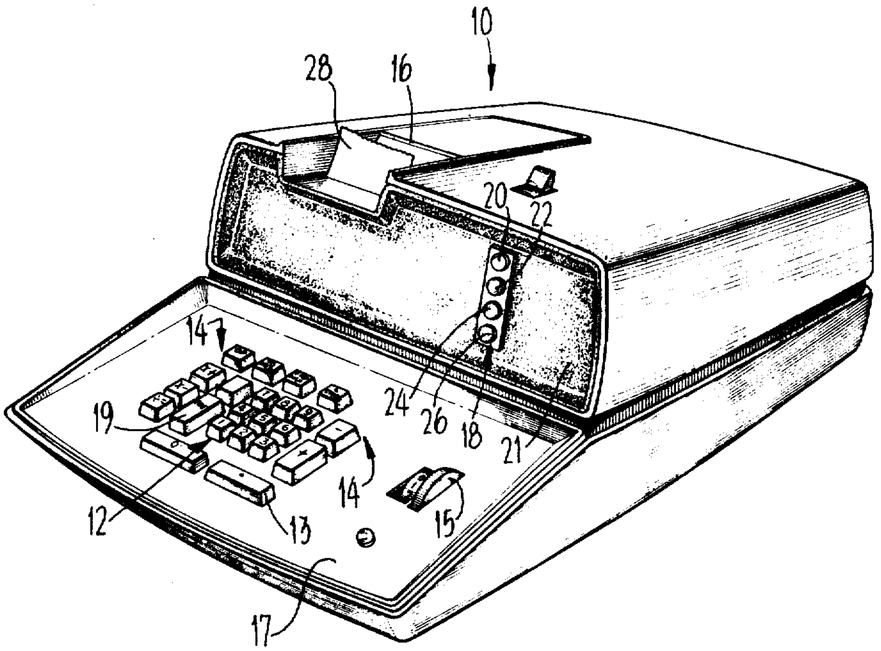
FIG. 1 is a perspective view of a data handling apparatus of the printing calculator type embodying the present invention.

In FIG. 1 there is shown a calculator 10 having a set of digit keys 12, a decimal point key 13, a set of function keys 14 and a decimal point setting switch 15 mounted on a keyboard 17, a printing mechanism 16, and a battery of register contents visual indicating means or register lamp unit 18 mounted on a front panel 21. Entry of a number into the calculator is accomplished by sequentially operating selected ones of the digit keys 12, with or without operation of the decimal point key 13. Ordinarily, entry of a number from the keyboard 17 is into one of a plurality of storage means or internal registers (to be described in more detail below). When a number is entered into any one of the plurality of internal registers during the solving of a problem, such fact must be remembered by the operator in order that he not cause, inadvertently, another number to be entered into a register, if he wishes the number previously contained in the register to be preserved. Therefore, there is provided a battery of lamps 18, individual ones of which are associated with individual internal registers within the calculator for indicating the presence or absence of data in each internal register during the operation of the calculator.

As seen in FIG. 1, the individual lamps 20, 22, 24 and 26 are arranged in a vertical stack or array. The lowermost lamp 26 is associated with a first register R1, the next lamp 24 is associated with a second register R2, while the lamp 22 is associated with a third register R3, and the topmost lamp 20 is associated with a fourth register R4. When there is no data at all (all zeroes) in any of the internal registers each lamp is extinguished. However, when there is data in any of the internal registers the lamp or lamps associated with those internal registers that contain data are illuminated. When data is cleared or erased from the internal registers the associated illuminated lamps will be extinguished.

Figure 2:
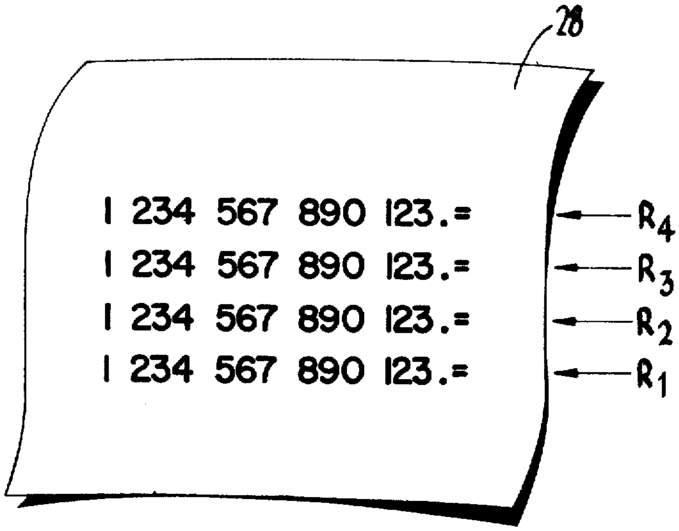
FIG. 2 is a partial view of a paper-tape printout accomplished with the calculator of FIG. 1 and illustrates the organization of data in the four printable internal registers.

A function control key 19 may be operated so as to cause the contents of all of the internal registers R1, R2, R3 and R4 to be printed automatically on paper tape 28. In FIG. 2 there is shown a printout of the contents of each of the four registers associated with the four lamps 20, 22, 24 and 26 wherein each register had contained therein thirteen whole number decimal digits, and the content of each register is the same as the other registers. The printing of the internal register's contents takes place in what may be termed a reverse order, i.e., the content of register R4 is printed first, then the content of R3, R2 and R1, as indicated in FIG. 2. While it is desirable to have such an automatic printout of the contents of each of the internal registers, it is also unnecessarily time-consuming for an operator to interrupt the performing of a series of keyboard operations in order to determine whether or not there is data in certain ones of the internal registers by printout. Thus, it can be readily understood that by rapid visual inspection of the battery of lamps 18 it can be ascertained which, if any, of the registers in the calculator contain data or contain no data (all zeroes).

There will now be described the system for controlling the illumination of the data indicating lamps in response to the presence or absence of data in the various internal registers of the calculator.

Figure 3:
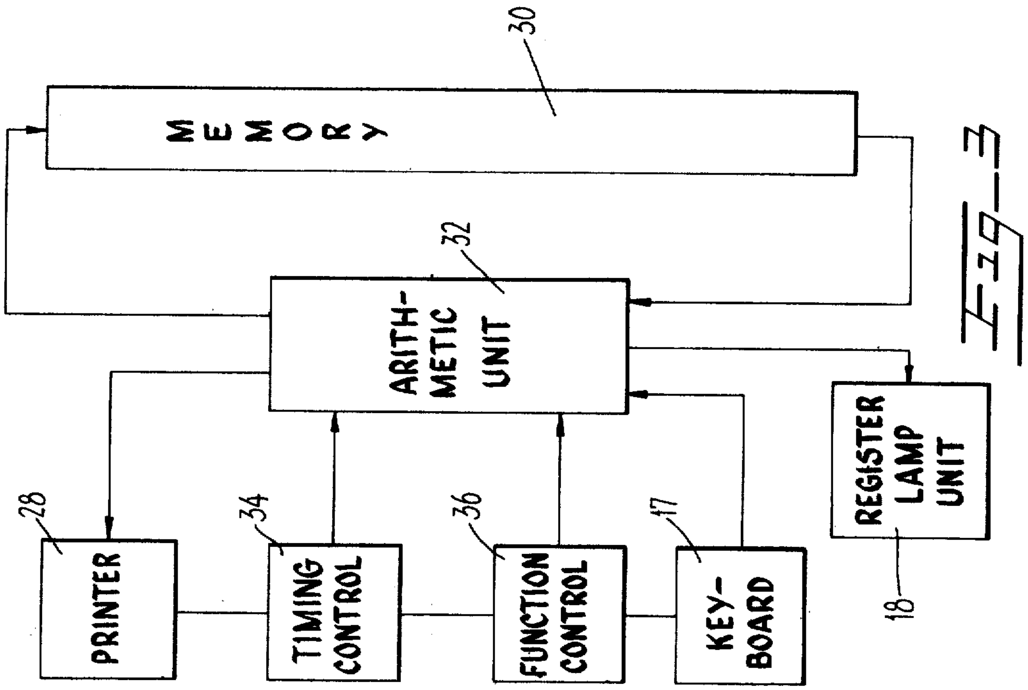
FIG. 3 is a simplified block diagram illustrating the major functional units of the calculator of FIG. 1.

In FIG. 3 there is illustrated, in block diagram form, the major functional units comprising one embodiment of the calculator 10 of FIG. 1. The calculator 10 includes a dynamic memory or storage means 30 interconnected with an arithmetic unit 32 to form a recirculating data or memory loop. A timing control unit or means 34 is interconnected with the other units of the calculator to synchronize the flow of data and control signals between the memory and the other units. The keyboard unit 17 is connected with a function control unit 36 and the arithmetic unit 32. Control of illumination of the lamps 20, 22, 24 and 26 of FIG. 1, according to the present invention, is accomplished by the register lamp unit 18 while initiation of data entry and manipulation is controlled by the keyboard unit 17. The printer unit 28 is connected between the timing control 34 and arithmetic unit 32 for printout of data under automatic commands from the function control unit or manually initiated commands from the keyboard unit.

Complete details of each of the major functional units shown in FIG. 3 are not set forth here. Only those details necessary to understanding the present invention are set forth here. The two previously mentioned copending U.S. applications disclose an electronic calculator of the type that may utilize the invention. However, it is to be noted that the calculators disclosed in the aforementioned copending applications utilize a cathode-ray tube for display of internal registers' data, rather than a printer as illustrated in the figures of the present application. The details for causing printout of data rather than display on a cathode-ray tube are not necessary to understanding the principles and operation of the present invention. However, it is to be kept in mind that the present invention is advantageous and useful in an electronic printing calculator that lacks visual display of data contained in its various internal registers.

The memory 30 in the illustrated embodiment of the present invention comprises a dynamic memory or what is commonly known as ultrasonic or magnetostrictive delay line through which information or data is repesented by and caused to travel in the form of a train of mechanical disturbances commonly termed acoustic pulses. The acoustic pulses are entered serially into the memory from the arithmetic unit, take a predetermined time to travel the length of the memory, and then are entered back into the arithmetic unit; this is termed a data loop. Each number entered from the keyboard 17 is converted or transformed into a series or set of pulses traveling serially through the data loop.

Briefly described, a digit of a number (which may include a whole portion and a decimal fraction portion) is represented by a set of pulses; the number of pulses being equal in number to the decimal value of the digit. Thus, for example, the decimal digit "4" is represented by a set of four pulses, while the decimal digit "7" is represented by a set of seven pulses. It can thus be understood that different decimal digits will be represented by different sets of pulses. This is called a pulse-count system of notation.

For the purpose of verbally describing this invention, the binary symbol "1" is representative of a pulse at a particularly space-time unit, or pulse time, hereinafter termed bit-time, in the memory 30, while the binary symbol "0" is representative of the lack of a pulse at a particular bit-time in the memory. Further, assume that the amount of bit-times in the memory required to hold the absolute value of a number is equal to nine. It can readily be understood that the decimal digit "4" would appear in the memory 30 as

000001111 while the decimal digit "7" would appear as

001111111

Thus, the number 47 might appear as

000111100111111l

From the above it can be understood that each single decimal digit requires a fixed number of bit-times in the memory. It can thus be understood that the number of bit-times required to represent the thirteen digit numbers, shown in FIG. 2 as contained in register R1, is equal to at least 117 bit-times. However, the present invention is utilized in an electronic calculator which can handle, internally, a number in each internal register having more than thirteen digits, but can printout only thirteen digits. It can thus be appreciated that even if the operator were to cause printout of the contents of an internal register to try to determine if such register contained data, only thirteen of the digits comprising the data (number) in the word would be printed out while the remaining digits would not be indicated in the printout. If the thirteen printed-out digits are each "0" while the non-printed-out digits are other than "0," the operator might erroneously conclude that there is no data in that register. The present invention will readily indicate to the operator whether or not there is data in the registers regardless of what the printout of such registers might be.

Figure 4:
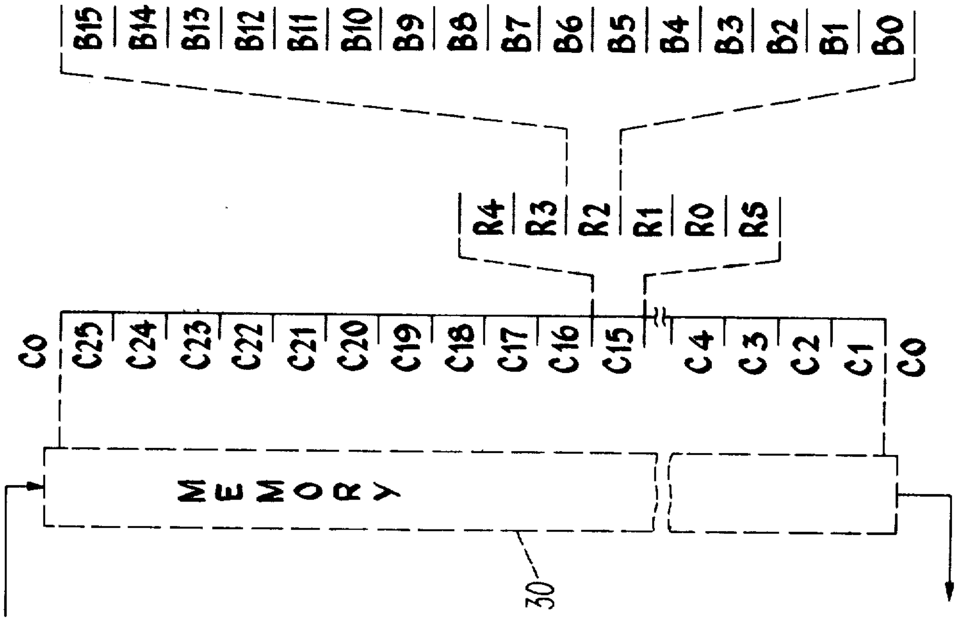
FIG. 4 is an illustration of the organization of data words in the memory of the calculator of FIGS. 1 and 3.

The organization of the data or space-time compartments in the memory will now be described with particular reference to FIG. 4. As shown in FIG. 4, the memory 30 may be considered to be divided into twenty-five equal space-time compartments labeled C1 through C25; each compartment is termed a column-time or C-time. The descriptive significance of the term "column" will be more apparent as the description proceeds. It is to be noted that in FIG. 4 there is also indicated a C0-time, the length (space or time) of which is somewhat indefinite, but may best be said to be the space or time between the occurrence of a last C-time (C25) and the occurence of the next succeeding first C-time (C1).

Each C-time is subdivided into six register or R-times of equal space-time length. For example, in FIG. 4 there is shown that C15-time is subdivided into RS, R0, R1, R2, R3 and R4 times. It will be understood that each of the other C-times are also subdivided into similar RS, R0, R1, R2, R3 and R4 times. Thus, it can be understood that there are twenty-five RS-times, twenty-five R0-times. twenty-five R1-times, etc. A set of the twenty-five R0-times comprise a special register termed R0-Register used internally by the calculator and is not concerned with the present invention. The set of twenty-five RS-times comprise a special storage register RS, the use of which is not germane to the present invention. The other four sets of register times pertain to the present invention, and henceforth in this description, mention of data or information in an internal register is to be understood as refering to one or more of the four sets of register times identified in FIGS. 2 and 4 as R1, R2, R3 and R4 unless clearly mentioned as otherwise.

Each register-time of each C-time is further subdivided in sixteen bit-times as illustrated in FIG. 4, with respect to the R2-time of C15-time. Each bit-time is the time-space occupied by one acoustic pulse or binary 1 in the memory 30. In general, a maximum of only nine of bit-times in each set of sixteen bit-times are utilized to represent a decimal digit, according to the pulse count system of notation mentioned previously.

A single internal register, within the meaning of that term as used herein may be considered to be formed by the set of twenty-five successive RN-times (where N represents 1, 2, 3 or 4). For example, register R1 is formed of the C1–C25, R1-times, while register R2 is formed of the C1–C25, R2-times, the register R3 is formed of the C1–C25, R3-times and register R4 is formed of the C1–C25, R4-times. It can thus be understood that the internal registers are comprised of serially interspersed space-time compartments according to a regular order.

The C3, R1-time contains the least significant digit of register R1, while C4, R1-time contains the next-to-least significant digit of register H1, etc. Likewise, C3, R2-times contains the least significant digit of register R2, etc. The same pattern exists for registers R3 and R4.

Assuming the numbers or data as set forth in the printout shown in FIG. 2 are contained in the four registers R1–R4 of the memory, it can be understood that C3-time will contain four successive sets of pulses, each set of which will be indicative of the least significant digit "3." As shown in the printout of FIG. 2, the least significant digits of the registers are lined up vertically thereby describing a "column"; thus, the descriptive term "column-time" or C-time.

If any one, or all, of the registers R1–R4 contain no data at all the associated R-times in each of the C-times forming the complete register will contain no pulses or binary 1's. Thus, by checking for the presence of at least one pulse, during those R-times comprising an internal register, it is possible to determine whether or not there is data in such register.

Figure 5:
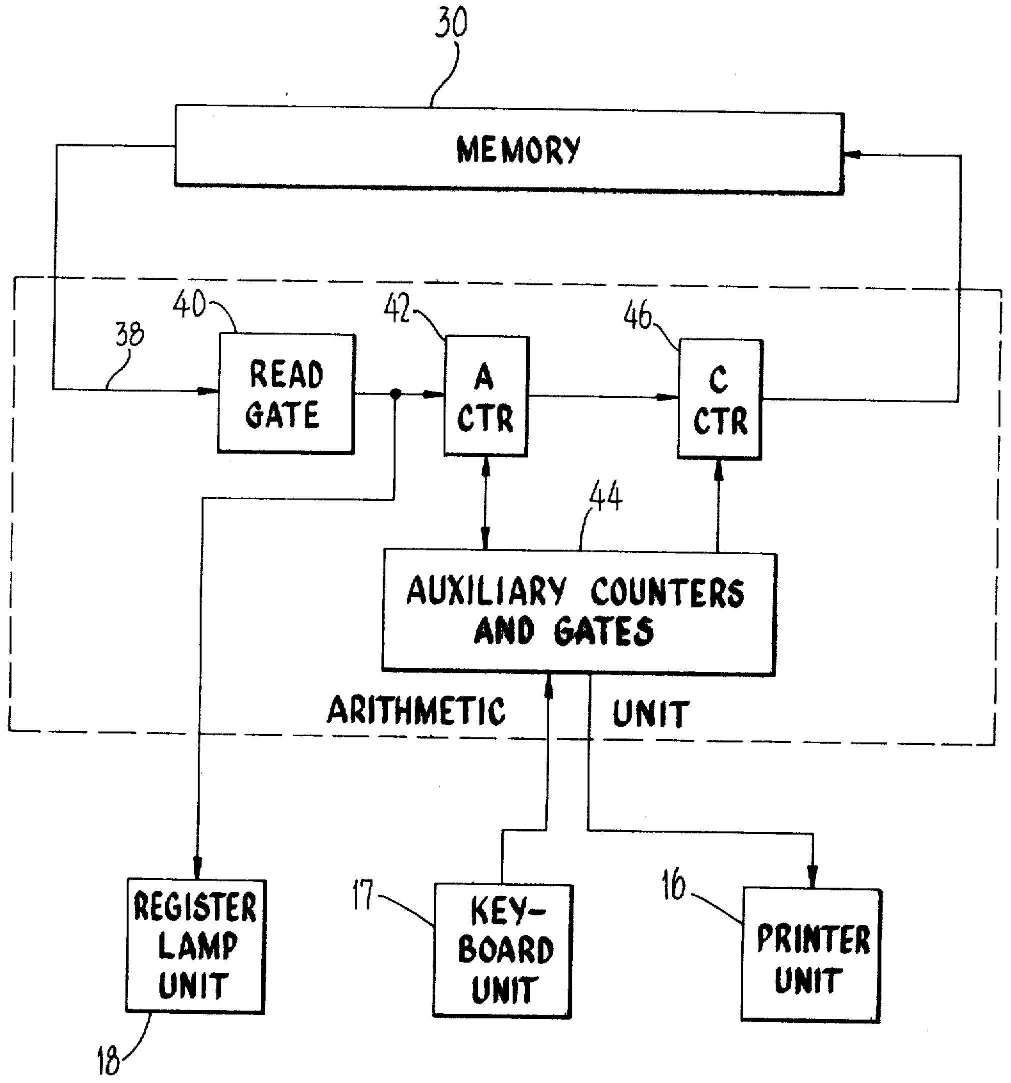
FIG. 5 is a simplified block diagram illustrating the data flow paths of the calculator of FIG. 1.

The manner of accomplishing the checking for the presence of pulses or data in each of the internal registers R1–R4 will now be described. Reference is now made to FIG. 5. All data flowing in the memory 30 exists therefrom and is transmitted over a lead 38 to a set of logic shown as read gate 40. Ordinarily, the read gate is enabled or open, thereby permitting transmission of the data representing pulses in serial fashion to the arithmetic unit's primary storage means or A-counter 42 and the register lamp unit 18 of the present invention.

Data from the A-counter 42 is furnished to the arithmetic unit's auxiliary counters and gates 44 for use in carrying out certain functions as commanded by the internal logic initiated by operation of certain function keys on the keyboard unit 17. Details of the use of data by the auxiliary counters and gates 44 are not necessary to an understanding of the present invention, and are not further described in this application.

Data contained in the A-counter and auxiliary counters may be transferred to a C-counter or storage means 46 from which it may then be read back into the memory.

Numerical data from the keyboard's digit keys are entered into the auxiliary counters and gates 44 and thence into the memory via the C-counter. Also, data in one of the counters of the auxiliary counter and gates unit may be transmitted to the printer unit 16 for printout on paper tape. The details of data transmission between the arithmetic unit and the printer and the keyboard are not necessary to an understanding of the present invention and are thus not further described in this application.

In order to properly gate information from the memory 30 to and through other logic elements comprising the calculator and, in particular, comprising the present invention, it is necessary to provide a source of regularly recurring timing signals.

Figure 6:
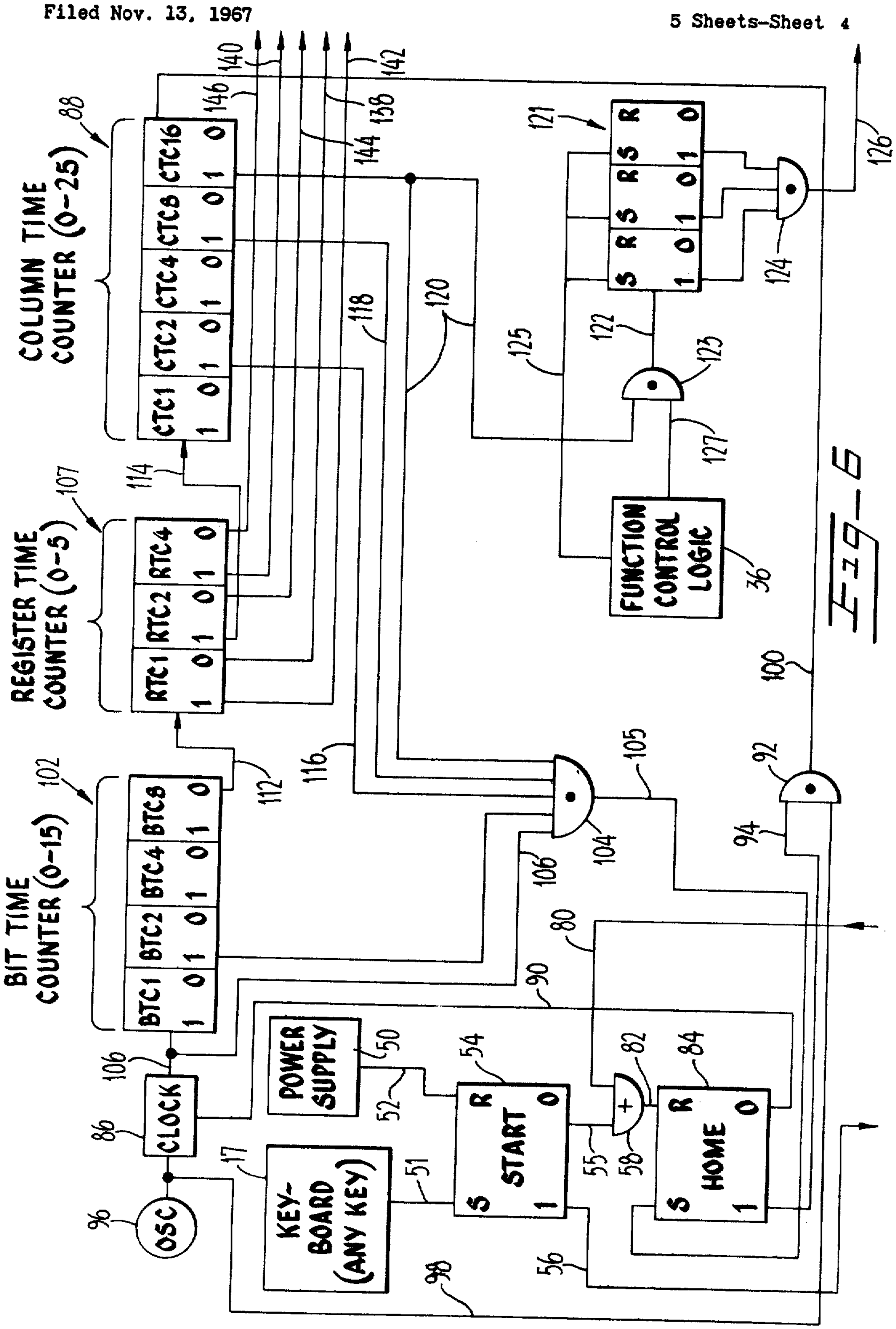
FIGS. 6 and 7, taken together, are a logic diagram showing one embodiment of the organization of the present invention as utilized in the calculator of FIG. 1.

FIG. 6 illustrates the logic elements of the timing control 34 of FIG. 4 insofar as timing signals are utilized by the present invention. The logic elements shown and described herein may each comprise any well known electronic circuit for implementing the required logic function, such as, for example, AND, OR, a shift register, a binary counter, and inverter, etc. The voltages and/or current values from a power supply necessary to operate the various logic elements are any predetermined values compatible with the circuits utilized. Throughout the remainder of this description various logic element input and output pulses and signals will be termed "1," or true level, while other pulses or signals will be termed "0," or false level; the actual values of such pulses or signals may be any predetermined value required for the logic element to properly perform its well-known intended function.

Prior to the furnishing of electrical power to the logic elements, such elements are in a nonoperative condition. Furnishing of electrical power by a power supply 50 effects the furnishing of operating power to the various logic elements of the calculator. In addition, the power supply will furnish, via a lead 52, a "1" level, or true pulse, to the reset or "R" input of a Start flip-flop 54 causing such flip-flop to be placed in its reset condition. A "1" level, or true signal, will be transmitted from the "0" output side of flip-flop 54 via lead 55, to one input of an OR gate 58. The other input (lead 80) to OR gate 58, is, at this time, "0" level, from AND gate 78 (FIG. 7) since no data is being read from the memory 30 at this time. Thus OR gate 58 will transmit and hold "1" level signal on lead 90, divides the frequency of the Home flip-flop 84, thereby placing and clamping the flip-flop 84 in its reset condition. Placing of Home flip-flop 84 in its reset condition causes a "1" level output signal to be transmitted from the flip-flop's 0 output, via lead 90, to a control input of a Clock 86.

An oscillator 96 transmits a continuous train of alternate "1" level and "0" level pulses to the Clock 86 at a predetermined frequency F which, in one embodiment, was 2.8 mHz. The Clock 86, which is enabled by the "1" level signal on lead 90, divides the frequency of the oscillator by two. The Clock may be, for example, a steered or toggled flip-flop which changes its state upon receipt of each "1" level pulse from the oscillator 96. Thus, a train of "1" level clock pulses will be transmitted to the input of a Bit-Time Counter 102, plus one input of an AND gate 104 via lead 106. A timing chain, comprising bit-time counter 102, a register-time counter 107 and column-time counter 88, will be incremented to its maximum count and then back to zero, and continue counting up again, over and over, with no significant action taking place until such time as the first key on the keyboard is actuated, as will now be described.

Upon manual actuation of any key on the keyboard unit 17 (FIG. 6) a momentary "1" level pulse is transmitted to the "S" or set input of Start flip-flop 54, via lead 51. The Start flip-flop 54 is thereby switched to its set conditions; a "1" level signal is transmitted from the flip-flop's 1-output to the input of a one-shot multivibrator 62 (FIG. 7) via lead 56. In addition, the "1" level signal on lead 55 (FIG. 6) to OR gate 58 is now changed to a "0" level signal, thereby unclamping Home flip-flop 84 so that it may be switched to its set state as will be described below.

The one-shot 62 (FIG. 7) responds to the "1" level input signal and transmits a single "1" level pulse over lead 64 to OR gate 66 which, in turn, transmits a single "1" level pulse, via lead 70, to the memory's write amplifier and transducer 72. The write amplifier and transducer 72 effect generation or launching of a single mechanical disturbance or acoustic pulse on the delay line comprising memory 30; this single acoustic pulse is hereinafter referred to as the SYNC pulse since generation of all other timing and control signals are referenced or synchronized with respect to the single SYNC pulse.

The SYNC pulse takes a finite period of time to travel the length of the delay line comprising the memory 30. The time duration of the SYNC pulse passing through the complete length of the delay line is somewhat greater than the time required for the timing chain to count from its initial zero condition to its full maximum condition. At some indefinite time after the SYNC pulse is entered into the memory, a count of "twenty-six" will be entered into the Column Time Counter 88 (FIG. 6), and the Bit-Time Counter 102 will have a count of "two." The AND gate 104 detects a count of column-time 26 (C26), bit-time 2 (B2), and transmits a "1" level pulse via a lead 105 to the "S" or set input of Home flip-flop 84. This will cause the Home flip-flop to be switched to its set condition, thereby causing a "0" level signal from the flip-flop's "0" output side to be transmitted to the control input of Clock 86 via lead 90. The Clock 86 is thereby disabled and transmits no further clock pulses to the bit-time counter 102.

Further, when Home flip-flop 84 is in its set condition, a "1" level signal is transmitted, via lead 94, to AND gate 92. The first "1" level pulse from oscillator 96 that is transmitted to AND gate 92, via lead 98, after the Home flip-flop 84 is placed in its set condition, will effect transmission of a "1" level pulse from AND gate 92, via lead 100, to the reset input of the column-time counter 88. The column time counter is thus cleared or placed in the zero count condition; this is column zero (C0) time. It will be apparent upon reading the below-described detailed description that the register-time counter 107 will, at this time, contain a count of "two." The bit-time counter will remain in the count of B2.

Figure 7:
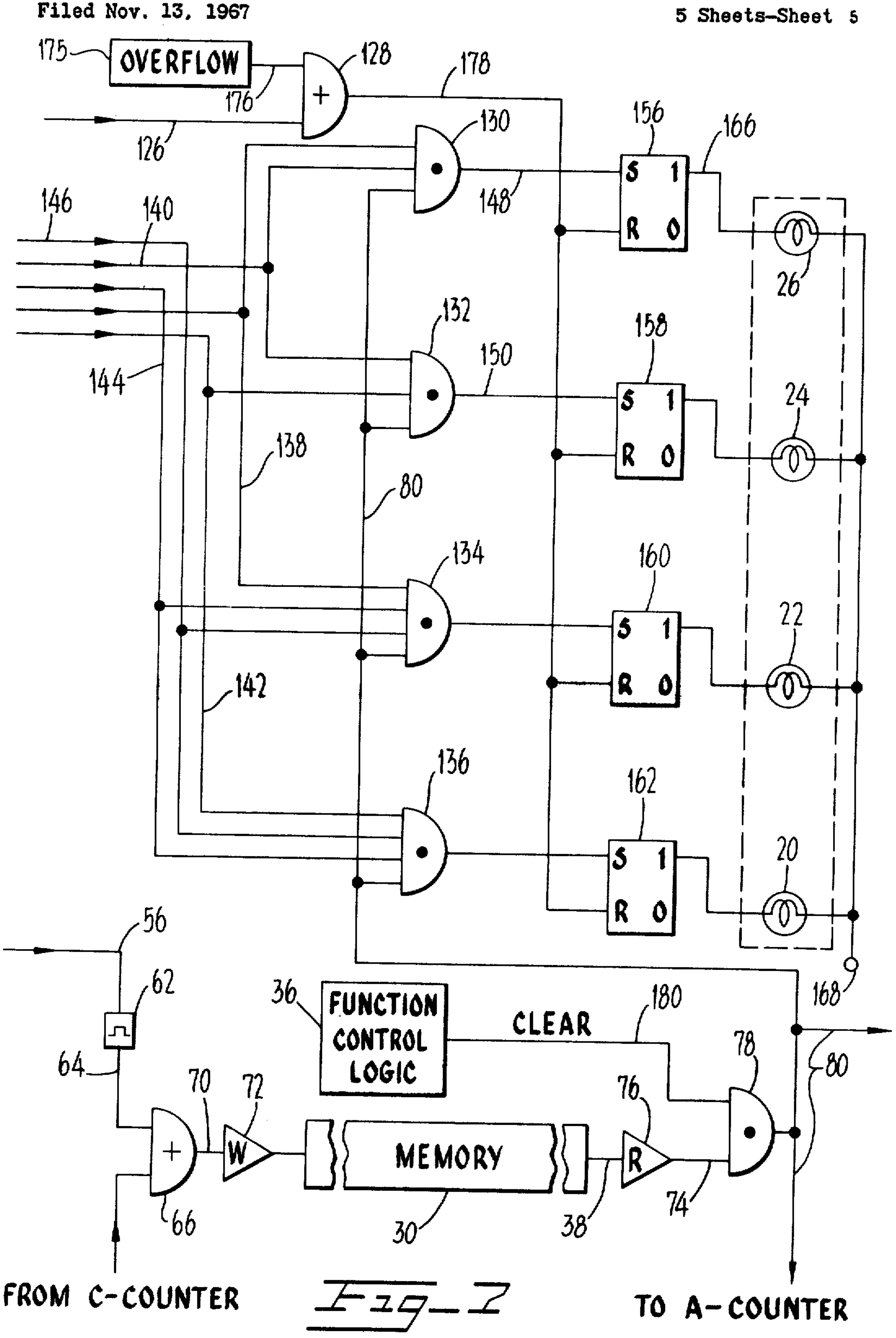

Now, when the SYNC pulse reaches the end of the memory 30, it causes read transducer and amplifier 76 (FIG. 7) to transmit, via lead 74, a "1" level pulse to an input of AND gate 78 (FIG. 7). Assuming that the other input of AND gate 78 is "1" level at this time (which it will be), a "1" level pulse is transmitted from AND gate 78 to the A-counter, and to the second input of OR gate 58 (FIG. 6).

The A-counter stores the SYNC pulse and treats it as a data pulse for subsequent transmission or reentry into the memory 30. The OR gate 58 (FIG. 6) now transmits a "1" level pulse to the R or reset input of Home flip-flop 84, thereby causing that flip-flop to be switched to its reset state. Resetting of the Home flip-flop 84, in response to the SYNC pulse, causes a "1" level signal to be transmitted to the input of Clock 86, via lead 90, thereby permitting the timing chain to generate regular recurring cycles of timing signals as will now be described.

A train of alternate "1" level and "0" pulses will be transmitted to the input of the bit-time counter 102, via lead 106, and one input of AND gate 104. The bit-time counter 102 may be any well-known binary counter, capable of counting from zero to fifteen and returning to zero count, such as, for example, four interconnected flip-flops or stages illustrated in FIG. 6 as stages BTC1, BTC2, BTC4 and BTC8. The bit-time counter is thus capable of being counted through sixteen different binary configurations or codes, each code being representative of an associated bit-time in the data train (FIG. 4). A "1" level output signal or pulse is transmitted from the bit-time counter to the register-time counter 107, via an interconnecting lead 112, each time the bit-time counter's fourth stage (BTC8) is changed from its set to its reset state; this will occur once each sixteen "1" level input pulses from Clock 86.

Likewise, the register-time counter 107 may be any well-known binary counter so interconnected as to be capable of counting from "zero" to "six" and returning to "zero" count, such as, for example, three interconnected flip-flops or stages illustrated in FIG. 6 as stages RTC1, RTC2 and RTC4. The register-time counter is thus capable of being counted through six different binary configurations or codes, each code being representative of an associated register-time in the data train (FIG. 4). A "1" level output signal or pulse is transmitted from the register-time counter to the column-time counter 88 via an interconnecting lead 114, each time the register-time counter's second stage, RTC2, is changed from its reset state to its set state; this will occur once each six register times (when the register-time counter is incremented from a count of "one" to "two").

The column-time counter 88 may be any well-known binary counter capable of counting from "zero" to "thirty-one" and returning to "zero" count such as, for example, five interconnected flip-flops or stages CTC1, CTC2, CTC4, CTC8 and CTC16. The column-time counter is thus capable of being counted through thirty-two different binary configurations or codes, the first twenty-five of which are associated with the column times (C-times) of the data train. As demonstrated in FIG. 4, only twenty-five column times are used in the present embodiment. Thus, there is provided a means for causing the column-time counter to be reset or changed to its zero (C0) condition immediately upon being incremented to a count of "twenty-six." This is accomplished by means of AND gate 104 in conjunction with Home flip-flop 84, plus AND gate 92. As shown in FIG. 6, the 1-outputs of the column-time counter stages CTC2, CTC8 and CTC16 are each connected via respective leads 116, 118 and 120 to AND gate 104. The three stages just mentioned will be in their set state when the column-time counter changes from a count of "twenty-five" to a count of "twenty-six."

From the above it will be understood that AND gate 104 will transmit a "1" level pulse on lead 105 when the bit-time counter contains a count of "two," the register-time counter contains a count of "two" and the column-time counter contains a count of "twenty-six." The "1" level pulse on lead 105 will set the Home flip-flop 84, thereby causing the column-time counter to be cleared to zero (via AND gate 92) and the Clock 86 will be caused to cease transmission of further pulses to the bit-time counter. The timing chain is, thus, in a B2, RS, C0 condition.

At some short, but indefinite period of time, after the Home flip-flop 84 is set, the SYNC pulse, as mentioned previously, will reach the exit end of the memory 30 (FIG. 7) and effect generation of another "1" level pulse via lead 80 to the OR gate 58 (FIG. 6) which will reset the Home flip-flop 84, thereby causing the timing chain to generate another basic set of timing signals as just described above.

All arithmetic functions, and other data manipulations in the calculator, are referenced to and controlled by the states of the various flip-flops comprising the timing chain as described above. Various logic gates are operatively coupled to the stages of the timing chain, in the manner of AND gate 104 (FIG. 6), to detect the occurrence of certain times in the timing cycle to properly carry out the required arithmetic and data manipulation functions, including operation of the present invention.

During the various bit-, register-, and column-times data set up by manual operation of the digit keys and function keys of the keyboard is transferred in pulse count notation from the C-counter into the appropriate space-time (bit-times) compartments of the memory's delay line such that some of the bit-times comprising an internal register may or may not contain pulses. The exact details of the structure required for causing data to be entered from the keyboard to the C-register and thence to the memory via OR gate 66 (FIG. 7) is not herein described since such structure is not necessary to an understanding of the present invention. It is to be understood, however, that data in an internal register is in the form of at least one acoustic pulse in the memory 30 occupying at least one of the bit-times associated with the particular internal register.

There is provided means for detecting the presence of pulses signifying data in each internal register of the memory. In FIG. 7 there is shown a set of four register data detection AND gates, 130, 132, 134 and 136. One input of each of the four register data detection gates is connected with the lead 80 from the output of AND gate 78 (FIG. 7). All data pulses being read or egressing from the memory 30 causes a corresponding "1" level pulse to be supplied to each of the register data detection gates. However, each register data detection gate has further control inputs from certain stages of the register-counter 107 (FIG. 6) of the timing chain.

Thus, AND gate 130 is connected with the "0" output of the first stage (RTC1) of the register-counter via lead 138, while the "1" output of the third stage (RTC4) is connected with the AND gate 130 via lead 140. When the first and third stages of the register-time counter are in their reset and set states, respectively, the data or pulses emerging from the memory is associated with internal register R1.

Likewise, the "1" output of the register-time counter's first stage (RTC1) is coupled with the AND gate 132 via lead 142, while the "1" output of the third stage (RTC4) is also coupled to AND gate 132. When the first and third stages of the register-time counter are both in their set states the data emerging from the memory is associated with internal register R2.

In a similar manner, the "0" outputs of all three stages of the register-time counter are connected to AND gate 134 via leads 138, 144 and 146, respectively. When all three stages of the register-time counter are in their reset states the data emerging from the memory is associated with the internal register R3.

Also, the AND gate 136 is connected with the "1" output of the first stage of the register-time counter, the "0" output of the second stage of the register-time counter and the "0" output of the third stage of the register-time counter. When the three register-time counter stages, RTC1, RTC2 and RTC4 are in their set, reset and reset stages, respectively, the data emerging from the memory is associated with internal register R4.

When the respective ones of the four gates 130, 132, 134 and 136 are enabled by the appropriate register-time signals from the register-time counter, data pulses emerging from the memory via AND gate 78 (FIG. 7) will effect a corresponding "1" level pulse on lead 80 and the enabled register data detection AND gate will transmit a "1" level pulse on an associated output lead 148, 150, 152 and 154, respectively.

Respective output leads 148, 150, 152 and 154 are connected to the set or "S" input of an associated data detected flip-flop or storage means 156, 158, 160 and 162, respectively.

Thus, during each individual internal register time, an associated register data detection AND gate is enabled, and any data pulses read from the memory 30 causing a "1" level pulse on lead 80 to the enabled AND gate will cause such AND gate to transmit a "1" level signal to the "S" or set input of associated data detected flip-flop and cause such flip-flop to be switched to its set state. When a data detected flip-flop is switched to its set state it remains in that state until reset, and any further data pulses read from the memory during subsequent associated internal register times will have no effect on the flip-flop.

A visual register data indicator means, or lamp 26, is suitably connected with the "1" output of the flip-flop 156 by means of a lead 166 and a source of electrical power shown as terminal 168. When the flip-flop 156 is in its set state the lamp 164 is energized, thereby giving a visual indication that internal register R1 has data contained therein which is circulating through the data loop (FIG. 5).

Likewise, the "1" output of each flop-flop 158, 160 and 162 has suitably connected thereto a visual indicating lamp 24, 22, and 20, respectively, which are also connected to the source of power 168. It will be understood that the appropriate lamp will be illuminated, and maintained illuminated, when the associated internal register data detected flip-flop is placed in its set state, according to the principles of operation set forth above.

It is to be noted that the data representative pulses emerging from the memory 30 may be cancelled by various operations in the arithmetic unit, such as, for example, overflow or exceeded capacity of the calculator to correctly handle the numbers involved. For such an event there is provided in the calculator's arithmetic unit a special set of logic elements (not shown) that detects overflow and generates an appropriate overflow signal for use in alerting the operator to such fact as by, for example, illuminating a special lamp (not shown) on the control panel, locking up the keyboard, and/or causing the printer to automatically print an Error or Overflow symbol.

As shown in FIG. 7 an overflow detection unit is shown, for the sake of simplicity, by a box 175. An overflow indication in the form of a "1' 'level pulse is furnished via lead 176 to OR gate 128 which will respond by transmitting a "1" level reset signal via lead 178 to each "R" or reset input of the data detected flip-flops 156, 158, 160 and 162. Those data detected flip-flops which were in their set state by virtue of having been set previously by data pulses having been read during the appropriate associated internal register times will be changed to their reset state and the associated data display lamp will, accordingly, be extinguished. Those data detected flip-flops which are already in their reset state at the time a reset signal is present on lead 128 will, of course, remain in such reset state.

Various arithmetic and data manipulation functions require that the timing chain pass through one or more complete cycles. There, is therefore, provided a means for counting cycles of the timing chain which is shown in FIG. 6 as a three-stage binary counter 121. In actual practice, such as, for example, in the calculators shown and described in the aforementioned U.S. patent applications, the counter 121 is referred to as an entry phase counter which may be preset to certain binary configurations upon operation of the selected ones of the function keys and function logic. As shown in FIG. 6, there is a line labeled 125 leading from the function control logic to each of the three stages of counter 121 for presetting the counter as required. Also, as shown in FIG. 6, the counting input to counter 121 is shown as a lead 122 connected to the output of an AND gate 123. One input to AND gate 123 is shown as a line 127 leading from the function control logic while the other input to AND gate 123 is shown as lead 120 from the "1" output of the last stage (CTC16) of a column-time counter 88. It will be understood that at C-16 time a "1" level pulse will be transmitted to AND gate 123. If AND gate 123 is also enabled by a "1" level signal on lead 127 from the function control logic, an incrementing signal will be transmitted on lead 122 to the input of counter 121. Thus, at each C-16 time of each timing cycle the counter 121 will be incremented by one. The maximum count of counter 121 is seven and the next succeeding input pulse will cause the counter to be returned to zero. An AND gate 124 detects when the counter 121 contains a count of seven and transmits a "1" level pulse via lead 126 to OR gate 128 (FIG. 7), for effecting resetting of the data detected flip-flops in the same manner just described for overflow.

During operation of the calculator it may be determined that data is present in one or more of the registers R1, R2, R3 and R4 by means of the data detection lamps and that the presence of such data in any of the registers is undesirable.

In order to clear data from each of the registers R1, R2, R3 and R4 a clear key on the keyboard is manually actuated, thereby transmitting a "0" level signal from the function control logic 36 (FIG. 7) on lead 180 to AND gate 78, thereby disabling that AND gate. Thus, any "1" level pulses being transmitted to the AND gate 78 via lead 74 as a result of data pulses being read from the memory 30 will inhibit any "1" level pulses from being transmitted on lead 80 to the A-counter or data detection gates during the R1, R2, R3 and R4 times.

The A-counter thus receives "zero data," which "zero data" is subsequently transferred back onto the memory 30 at the appropriate R1, R2, R3 and R4 times via the C-counter. Thus, the internal registers are cleared of data.

There has thus been shown and described a means for visually indicating the presence and absence of data in a plurality of internal registers of a calculator without having to display the data that may be present in such internal registers. Further, there has been shown and described a novel means for detection of a data pulse in at least one space-time compartment of a set of interlaced space-time compartments making a serial data storage means.

While the principles of the invention have been made clear in the illustrative embodiment, there will be obvious to those skilled in the art, many modifications in structure, arrangement, proportions, the elements, materials and components, used in the practice of the invention, and otherwise, which are adapted for specific environments and operating requirements, without departing from these principles. The appended claims are, therefore, intended to cover and embrace any such modifications within the limits only of the true spirit and scope of the invention.

What is claimed is:

1. In a data handling apparatus wherein a plurality of datums may be present in said appartus at the same time, in the form of associated predetermined sets of signals, each set including at least one signal, and wherein the datums represented by said sets of signals are not visually displayed to an operator during various operations of said apparatus, the combination comprising:

a memory means for storage therein, at the same time, all of said sets of signals, said signals being furnished to and transmitted from said memory means seriatim, the signals of individual sets being interspersed with the signals of other sets when in said storage means according to a regular sequence; and a plurality of visual indicating means for visually indicating the presence of any of said datums in said apparatus without displaying visually the datum whose presence is so indicated, individual ones of said visual indicating means being responsive to the transmission of any one of the signals associated with an individual one of said sets of signals from said memory means during an associated set of predetermined time intervals.

2. In an apparatus according to claim 1 wherein individual ones of said visual indicating means includes a first gate means for generating a second signal upon the occurrence of any signal of the set of associated signals transmitted from said memory means, during the associated predetermined time interval;

bistable means switchable between a first state and a second state, said bistable means being normally in one of said states, said bistable means being responsive to the first occurring one of said second signals for switching to the other one of said states;

lamp means operatively coupled to said bistable means and controlled by the state of said bistable means wherein said lamp means presents a first visual stimuli when said bistable means is in one of said states and presents a second visual stimuli when said bistable means is in the other one of said states.

References Cited

UNITED STATES PATENTS

| | | | |
|---|---|---|---|
| 3,380,031 | 4/1968 | Clayton et al. | 340—172.5 |
| 3,375,498 | 3/1968 | Scuitto et al. | 340—172.5 |
| 3,372,381 | 3/1968 | Raspanti | 340—172.5 |
| 3,324,458 | 6/1967 | MacArthur | 340—172.5 |
| 3,248,703 | 4/1966 | Moore et al. | 340—172.5 |
| 3,156,815 | 11/1964 | Smeltzer | 340—172.5 |
| 3,045,211 | 7/1962 | Auerbach | 340—172.5 |

GARETH D. SHAW, Primary Examiner

UNITED STATES PATENT OFFICE
CERTIFICATE OF CORRECTION

Patent No. 3,495,221 Dated February 10,1970

Inventor(s) CARL E. HERENDEEN

It is certified that error appears in the above-identified patent and that said Letters Patent are hereby corrected as shown below:

Column 1, lines 3 and 4, "Friden, Inc., a corporation of Delaware" should read --The Singer Company, a corporation of New Jersey--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents